United States Patent [19]

Wakabayashi et al.

[11] Patent Number: 4,796,140
[45] Date of Patent: Jan. 3, 1989

[54] REMOVABLE DISK CONSTRUCTION

[75] Inventors: Manabu Wakabayashi, Yokohama; Tohru Sampei, Kanagawa; Hiroshi Kanai, Hitachi; Tomiyoshi Satoo, Hitachi; Yosuke Nagano, Hitachi; Takeo Sonobe, Hitachi; Isao Utsugi, Hitachi, all of Japan

[73] Assignee: Hitachi, Ltd., Tokyo, Japan

[21] Appl. No.: 923,497

[22] Filed: Oct. 27, 1986

Related U.S. Application Data

[63] Continuation of Ser. No. 505,722, Jun. 20, 1983, abandoned.

[30] Foreign Application Priority Data

Jun. 21, 1982 [JP] Japan .................. 57-107184

[51] Int. Cl.4 ............................................. G11B 23/03
[52] U.S. Cl. ................... 360/133; 360/99.04; 369/282
[58] Field of Search ........ 360/133, 135, 128, 131-132, 360/97, 99, 86; 346/137; 369/261, 270-271, 282

[56] References Cited

U.S. PATENT DOCUMENTS

| | | | |
|---|---|---|---|
| 4,149,207 | 4/1979 | Porter, Jr. et al. | 360/133 |
| 4,152,740 | 5/1979 | Stratton | 360/133 |
| 4,166,622 | 9/1978 | Rager | 369/270 |
| 4,445,157 | 4/1984 | Takahashi | 360/133 |
| 4,459,628 | 7/1984 | Barton | 360/133 |
| 4,503,530 | 3/1985 | Hinlein et al. | 369/270 |
| 4,532,564 | 7/1985 | Larson et al. | 360/97 |

OTHER PUBLICATIONS

Kluth, A. "Disk Pack Locating Device", IBM TDB, Oct. 1970, vol. 13, No. 5, p. 1242.

Primary Examiner—Stuart N. Hecker
Assistant Examiner—David J. Severin
Attorney, Agent, or Firm—Antonelli, Terry & Wands

[57] ABSTRACT

A rotary disk including a recording and reproducing sheet, and a hub formed of hard material secured to a central portion of the sheet. The hub comprises a center opening adapted to receive a main spindle of a turntable of disk driving means, two planar surfaces arranged in an intersecting relation to each other and formed on a projecting wall portion of the center opening, and a resilient member located in a position facing the two planar surfaces for pressing the spindle against the two planar surfaces. Even if the recording and reproducing sheet of the rotary disk is a thin magnetic sheet, there is no risk of damage of the sheet. When the rotary disk is set on the turntable, the center of rotation of the rotary disk and the center of rotation of the turntable can be automatically brought into alignment with each other.

9 Claims, 9 Drawing Sheets

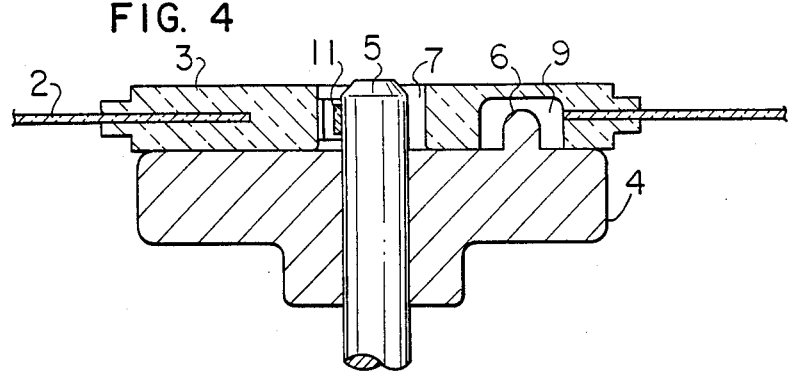
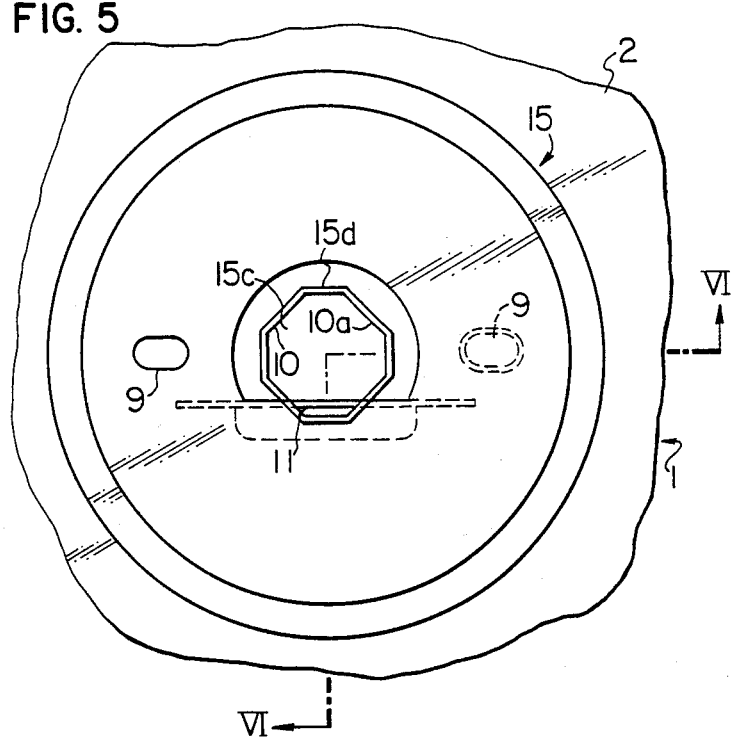
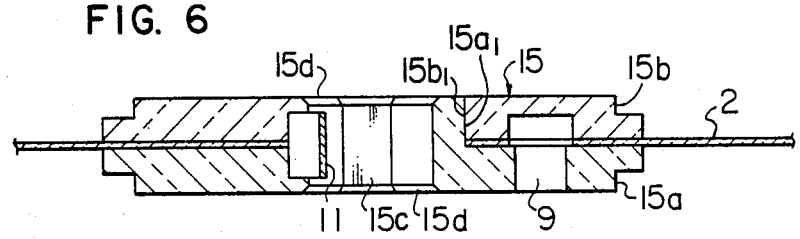

_REMOVABLE DISK CONSTRUCTION_

This is a continuation of application Ser. No. 505,722, filed June 20, 1983, now abandoned.

BACKGROUND OF THE INVENTION

This invention relates to rotary disks in the form of sheets, and, more particularly, to a rotary disk of compact size using a recording and reproducing sheet of small thickness.

A rotary disk of the above described type is placed in a case or housing for accommodating a recording and reproducing head, with the case being provided with a shutter for opening and closing a window thereof through which the rotary disk is introduced. The rotary disk has a plurality of concentric recording tracks containing various types of information adapted to be written to and read out by, for example, a magnetic head of a magnetic recording and reproducing apparatus through the window of the case. To this end, it is essential that, when the case or housing with the rotary disk is, for example, set on a turntable for supporting a disk of the magnetic recording and reproducing apparatus, the center of rotation of the rotary disk within the case and the center of rotation of the turntable be in alignment with each other at all times. In, for example, U.S. Pat. No. 4,149,207 a rotary disk is proposed wherein the magnetic sheet is formed with a non-circular opening for receiving a hub for connecting the rotary disk with a spindle of the turntable, and a receiving surface located outwardly of the non-circular opening and engaged with a drive pin of the turntable, with the magnetic sheet and the hub being arranged such that their centers of rotation are in alignment with each other.

In the above described patented construction, when the turntable is loaded with the case containing the rotary disk and rotated, the drive pin is pressed against the receiving surface and the non-circular opening formed in the magnetic sheet would have its edge urged strongly against an outer peripheral edge of the hub. Thus, when the magnetic sheet has a small thickness, the edge portion of the non-circular opening pressed against the outer peripheral edge of the hub is ruptured.

Another disadvantage of the above described patented construction resides in the fact that correct aligning of the center of rotation of the magnetic sheet with the center of rotation of the hub can not be obtained merely by placing the case on the turntable, and the rotary disk moves leftwardly or rightwardly on the turntable within the limits corresponding to the distance covered by the movement of the hub in the non-circular opening of the magnetic sheet.

Accordingly, with the patented construction, it is necessary that the hub be mounted on the magnetic sheet in such a manner that the former is movable horizontally in a non-circular opening of the magnetic sheet.

Additionally with the rotary disk of the above-mentioned patent, the edge of the non-circular opening of the magnetic sheet is pressed against the outer peripheral edge of the hub only by a pressing force applied by the drive pin, so that when any disturbance develops which might cause the turntable with the case to vibrate the non-circular opening of the magnetic sheet and the hub are displaced from each other to a position in which they are not in correct contact.

The aim underlying the present invention essentially resides in providing a rotary disk which is simple in construction, free from the risk of the magnetic sheet being ruptured even if its thickness is small and which enables a center of rotation thereof to be automatically brought into alignment with the center of rotation of the turntable as soon as the rotary disk is set on the turntable.

Another object is to provide a rotary disk which minimizes, if not avoids, the possibility of the rotary disk being displaced from the proper position on the turntable due to a disturbance that might act on the case and the turntable.

In accordance with the present invention, the rotary disk, comprising a recording and reproducing sheet and a hub of hard material secured to a central portion of the sheet, is provided with a center opening formed in the hub for loosely receiving a main spindle of the turntable of the disk driving means, with two planar surfaces being formed in an intersecting relationship to each other on a peripheral wall of the center opening, and a resilient member being located in face-to-face relationship to the two planar surfaces for pressing the main spindle against the two planar surfaces.

According to further features of the present invention, a receiving surface is formed on either side surface of the hub, with the receiving surface receiving a pressing force applied by a drive shaft of the turntable when the latter rotates, in order to press the two planar surfaces of the center opening against the main spindle of the turntable.

BRIEF DESCRIPTION OF THE DRAWINGS

FIG. 4 is a sectional view taken along the line IV—IV in FIG. 3;

FIG. 5 is a plan view, on an enlarged scale, of a modification of the rotary disk made constructed in accordance with the principle of the invention;

FIG. 6 is a sectional view taken along the line VI—VI in FIG. 5;

DETAILED DESCRIPTION

Figure 1:
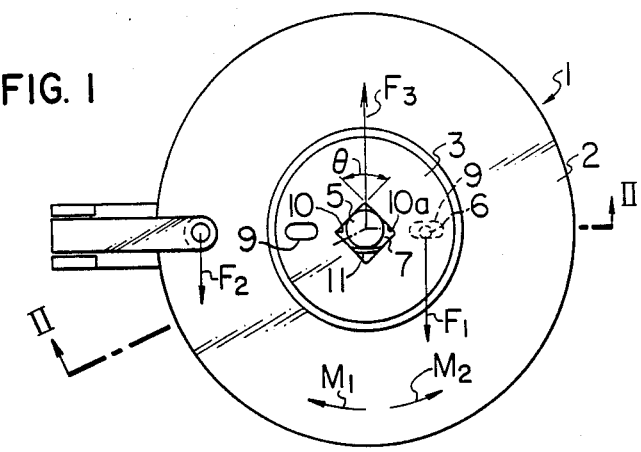
FIG. 1 is a plan view of a rotary disk constructed in accordance with the principle of the invention.

Referring now to the drawings wherein like reference numerals are used throughout the various views to designate like parts and, more particularly, to FIGS. 1-4 according to these figures, a rotary disk generally designated by the reference numeral 1 comprises a flexible thin sheet 2, and a hub 3 of hard material secured to a central portion of the sheet 2. The sheet 2 has an outer diameter of about 72 mm and a thickness of 77μ, and the hub 3 has an outer diameter of about 16 mm and a thickness of 4 mm. The hub 3 is preferably formed of synthetic resinous material of high hardness and high wear resistance.

A turntable 4 for rotating the disk 1 is provided with a main spindle 5 located in the central portion, and a drive shaft 6 located outwardly of the main spindle 5. The main spindle 5 and the drive shaft 6 are circular in cross section.

The hub 3 is formed with a center opening 7 for accommodating the main spindle 5 and a recess 9 formed on either side surface thereof and, with the recess 9 including a receiving surface 8 for engageably receiving the drive shaft 6. The provision of the receiving surfaces 8 on opposite side surfaces of the hub 3 allows the rotary disk 1 to be supported on the turntable 4 on either one of its two sides.

The center opening 7 is formed at its wall with at least two planar surfaces 10 and 10$a$ which are located at a predetermined included angle $\theta$ in the range between 60° and 120°. The center opening 7 is formed therein with a resilient member 11 for pressing the main spindle 5 of the turntable 4 against the two planar surfaces 10, 10$a$. The resilient member 11 exerts a pressing force on the main spindle 5 to a certain degree such that when the main spindle 5 of the turntable 4 is inserted in the center opening 7 of the rotary disk 1, the main spindle 5 is brought into light touch with the two planar surfaces 10, 10$a$. The resilient member 11 is in the form of a plate spring of metal having a thickness in the range of between 0.1 and 0.3 mm. However, the invention is not limited to this specific form and the construction of the resilient member 11.

Figure 2:
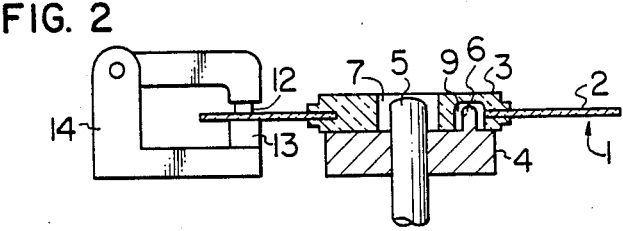
FIG. 2 is a sectional view taken along the line II—II in FIG. 1.
Figure 3:
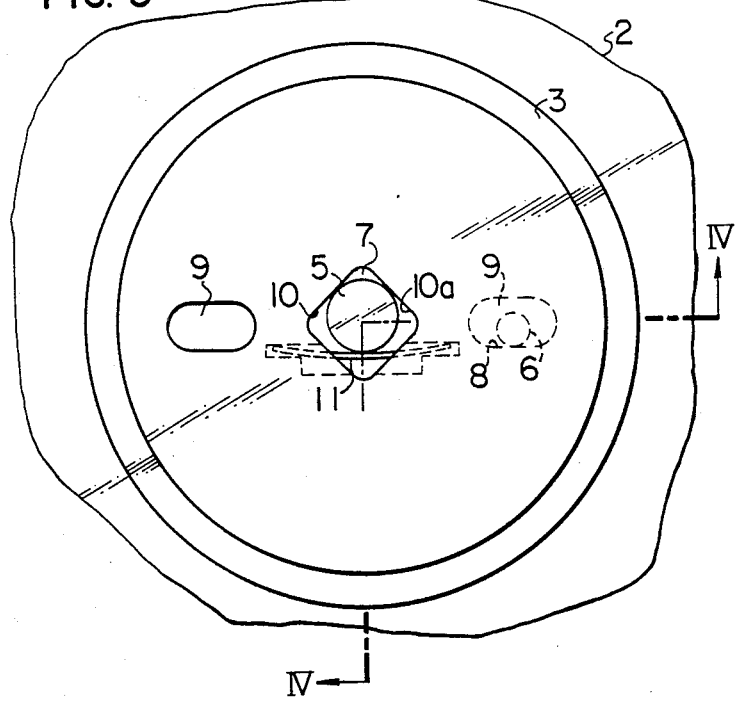
FIG. 3 is a plan view, on an enlarged scale, of portions of the rotary disk shown in FIG. 1.

When the rotary disk 1 is set on the turntable 4, a pad 12 is arranged on a top surface of the sheet 2 and a magnetic head 13 is arranged on a bottom surface thereof as shown in FIG. 2. The pad 12 and the magnetic head 13 are supported on a carriage 14 radially movable with respect to the rotary disk 1.

As shown in FIGS. 5 and 6, a hub generally designated by the reference numeral 15 of the rotary disk 1 includes a lower structural member 15$a$, formed with a boss 15$a_1$, and an upper structural member 15$b$ formed with a hole 15$b_1$ adapted to fit the boss 15$a_1$ so that the lower and the upper structural members 15$a$ and 15$b$ of the hub 15 hold the sheet 2 and the resilient member 11 therebetween and secure the same in place. The hub 15 is formed with a center opening 15$c$ of octagonal shape which is chamfered as indicated at 15$d$.

When the rotary disk 1 is set on the turntable 4 while the main spindle 5 of the turntable 4 is inserted in the center opening 7, 15$c$ of the rotary disk 1, the main spindle 5 is pressed by the resilient member 11 against the two planar surfaces 10 and 10$a$ of the center opening 7, 15$c$. Thus, the center of rotation of the rotary disk 1 is automatically brought into alignment with the center of rotation of the turntable 4 simultaneously as the rotary disk 1 is set on the turntable 4.

If the included angle $\theta$ between the two planar surfaces 10, 10$a$ is set at a value over 60°, the resistance that might occur when the rotary disk 1 comes out from the turntable 4 can be neglected. If the included angle $\theta$ is less than 120°, the position in which the main spindle 5 is set against the two planar surfaces 10 and 10$a$ is not sufficiently variable for a disturbance that might occur.

When the turntable 4 is rotated after the rotary disk 1 is set thereon, the drive shaft 6 presses the receiving surface 8 with which it comes into engagement, so that a pressing force F1 is exerted on the hub 3, 15 as shown in FIG. 1 to impart thereto a moment M1 tending to rotate the rotary disk 1 in a clockwise direction with respect to the main spindle 5. Meanwhile, rotation of the rotary disk 1 causes a frictional force F2 to be produced by the pad 12 and the magnetic head 13 as shown in FIG. 1. The frictional force F2 imparts a moment M2 to the rotary disk 1 which tends to rotate the same in a counterclockwise direction with respect to the main spindle 5.

The pressing force F1 and the frictional force F2 act in a manner to press the two planar surfaces 10 and 10$a$ of the hub 3, 15 against the main spindle 5. As a result, the main spindle 5 pushes back the hub 3, 15 with a force F3 representing the resultant of the pressing force F1 and the frictional force F2 as shown in FIG. 1. While the rotary disk is rotating, the two planar surfaces 10, 10$a$ of the hub 3, 15 are strongly pressed against the main spindle 5 by a pressing force exerted by the resilient member 11 and a pressing force exerted by the drive shaft 6, so that there is no risk that the main spindle 5 and hub 3, 15 might be displaced from each other in the position in which they are in contact due to any disturbance which might cause the turntable 4 and the rotary disk 1 to vibrate.

If only the pressing force exerted by the resilient member 11 is applied to the two planar surfaces for avoiding the risk of the main spindle 5 being displaced from the hub 3, 15 in the position of contact due to a disturbance, then it would be necessary to increase the pressing force exerted by the resilient member 11. However, in the rotary disk 1 shown in FIGS. 1-6, the two planar surfaces 10, 10$a$ of the hub 3, 15 are pressed against the main spindle 5 by the resultant of the pressing force exerted by the resilient member 11 and the pressing force exerted by the drive shaft 6, so that it is possible to reduce the pressing force exerted by the resilient member 11 at a low level. If the pressing force exerted by the resilient member 11 could be reduced, loading and unloading of the turntable 4 with the rotary disk would be facilitated and wear caused on the planar surfaces 10, 10$a$ of the hub 3, 15 and the main spindle 5 would be reduced.

In bringing the center of rotation of the turntable 4 into alignment with the center of rotation of the rotary disk 1, the main spindle 5 and the drive shaft 6 do not directly push the sheet 2 but rather push the hub 3, 15 secured to the sheet 2. Thus any damage that might be caused to the sheet 2 can be avoided.

With a rotary disk 1 constructed in the manner described hereinabove, it is possible to merely secure the hub 3, 15, which has the receiving surfaces 8, the two planar surfaces 10, 10$a$, and the resilient member 11, to the central portion of the sheet 2. Therefore, the rotary disk 1 is very simple in construction, easy to fabricate and high in productivity.

Figure 7:
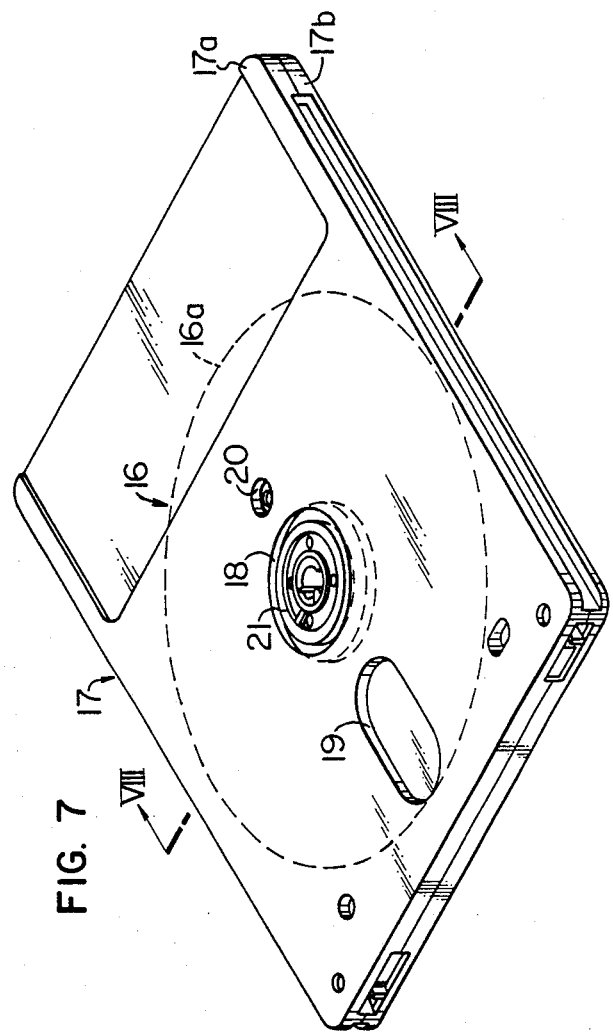
FIG. 7 is a perspective view of the rotary disk incorporating therein the principle of the invention, suitable for production on a mass production basis.
Figure 8:
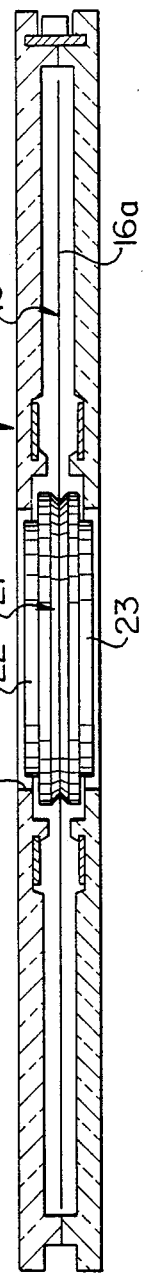
FIG. 8 is a sectional view taken along the line VIII—VIII in FIG. 7.
Figure 9:
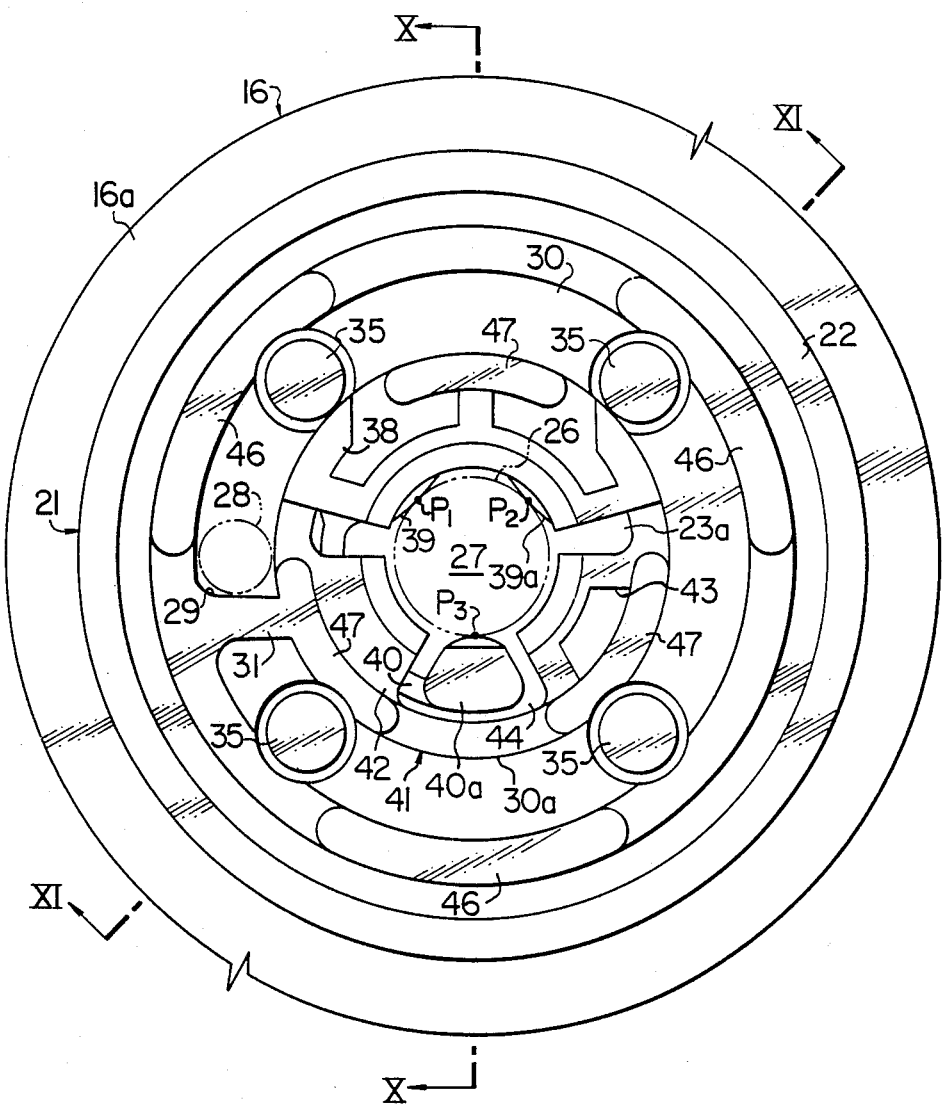
FIG. 9 is a plan view, on an enlarged scale, of the rotary disk shown in FIG. 7.

In FIGS. 7-15, a rotary disk according to the invention is provided which may be produced on a mass production basis. More specifically, as shown in FIGS. 7 and 8, a rotary disk generally designated by the reference numeral 16 is put to use while being held in a case generally designated by the reference numeral 17 composed of an upper case member 17a and a lower case member 17b. The case 17 is formed at a top and bottom surface thereof with a center aperture 18 for receiving a collet or a disk holding table, described more fully hereinbelow, a magnetic head receiving opening 19 and an indexing aperture 20. The case 17 may have a liner attached to an inner surface thereof so as to clean the disk.

The rotary disk 16 comprises a magnetic sheet 16a of disk-shape having a circular opening 16b in the center, and a hub 21 for holding a peripheral edge portion of the circular opening 16b.

The hub 21 is composed of an upper structural member 22 and a lower structural member 23 both formed of allyl resin. The hub 21 is formed with a center opening 27 for receiving a main spindle 26 connected to a top surface of a turntable 25 of disk driving means 24, described more fully hereinbelow, and at least one receiving surface 29 for receiving a drive shaft 28 of the turntable 25. The receiving surface 29 may be provided at either one or both of top and bottom surfaces of the hub 21 by an arcuate guide groove 30 of an and a projection 31 defining two ends of the arcuate groove 30.

Figure 10:
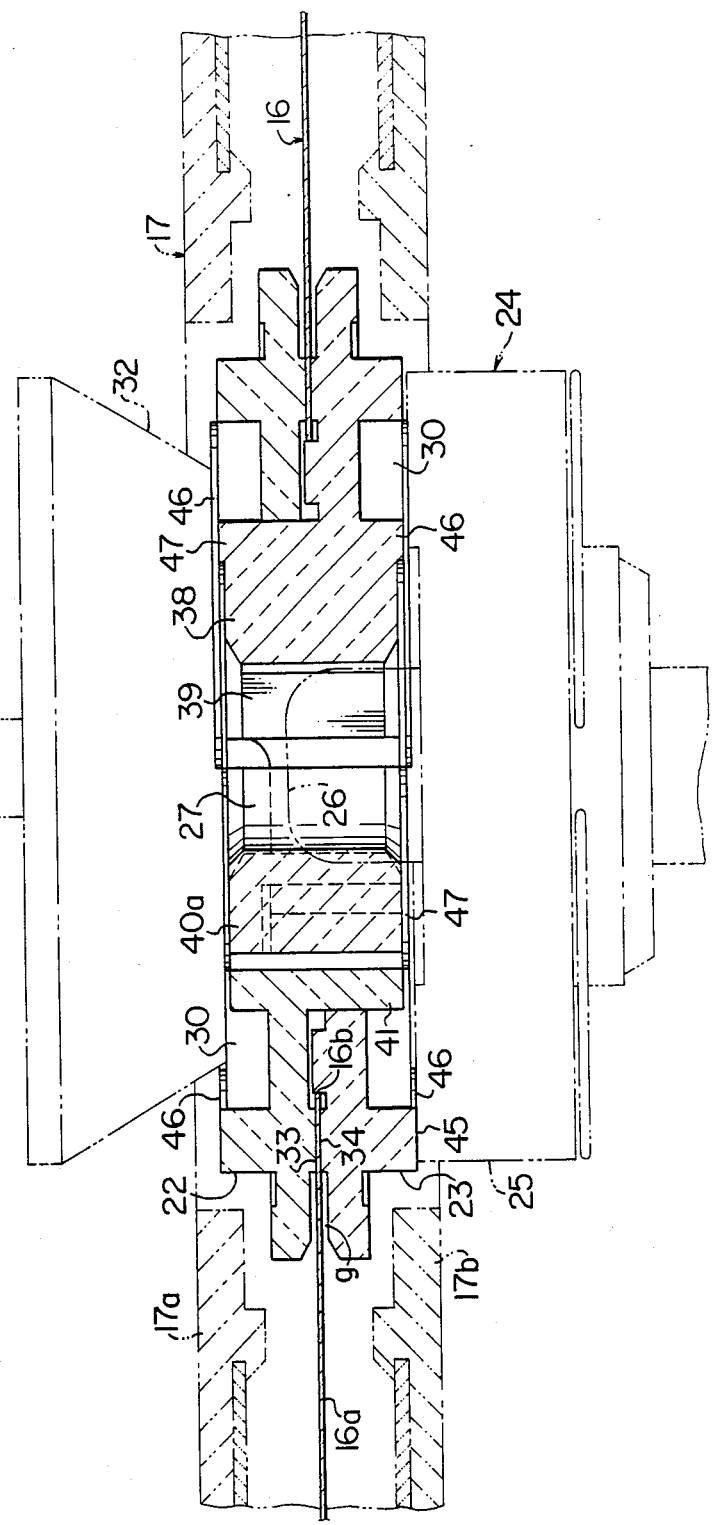
FIG. 10 is a sectional view taken along the line X—X in FIG. 9.
Figure 11:
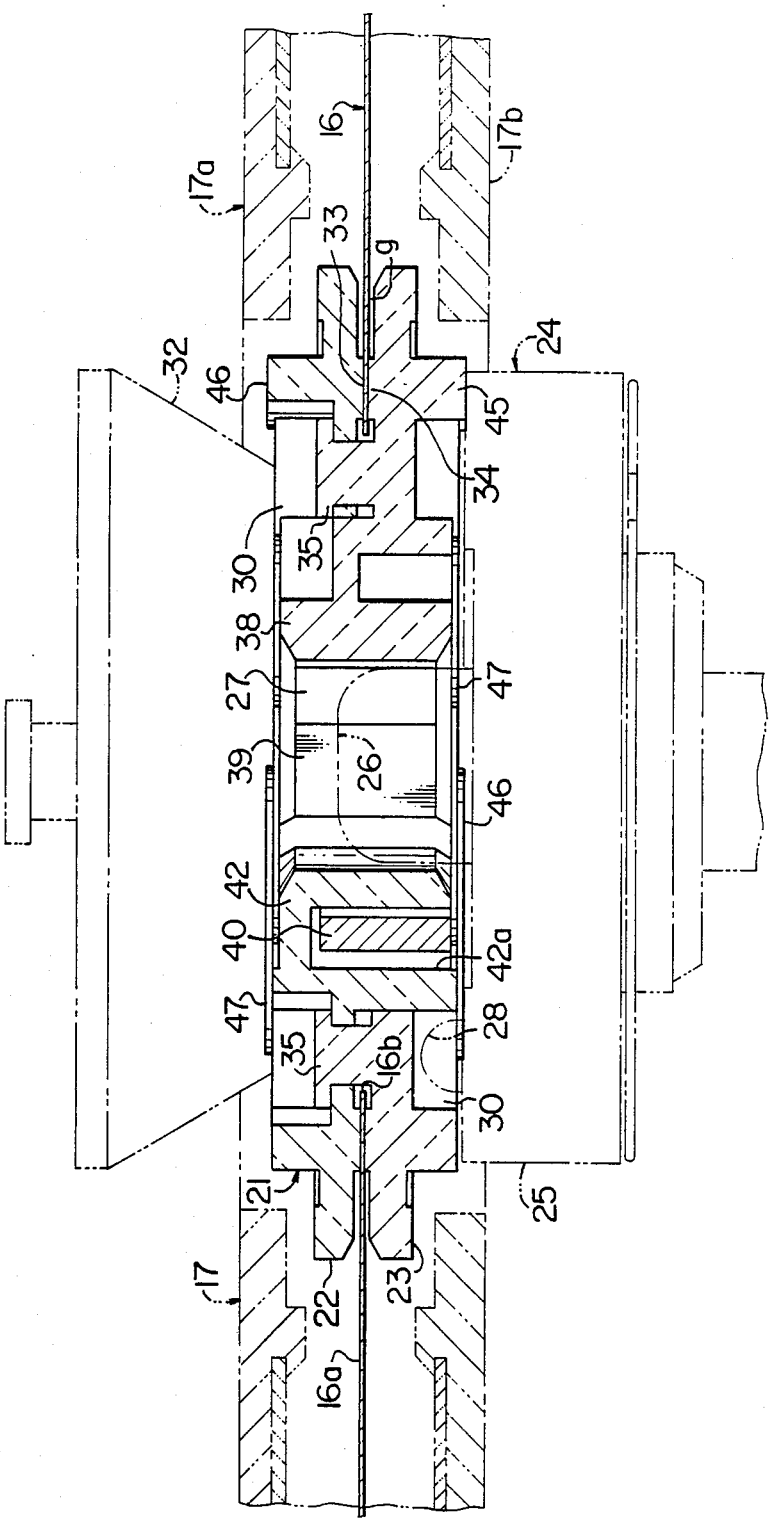
FIG. 11 is a sectional view taken along the line XI—XI in FIG. 9.
Figure 12:
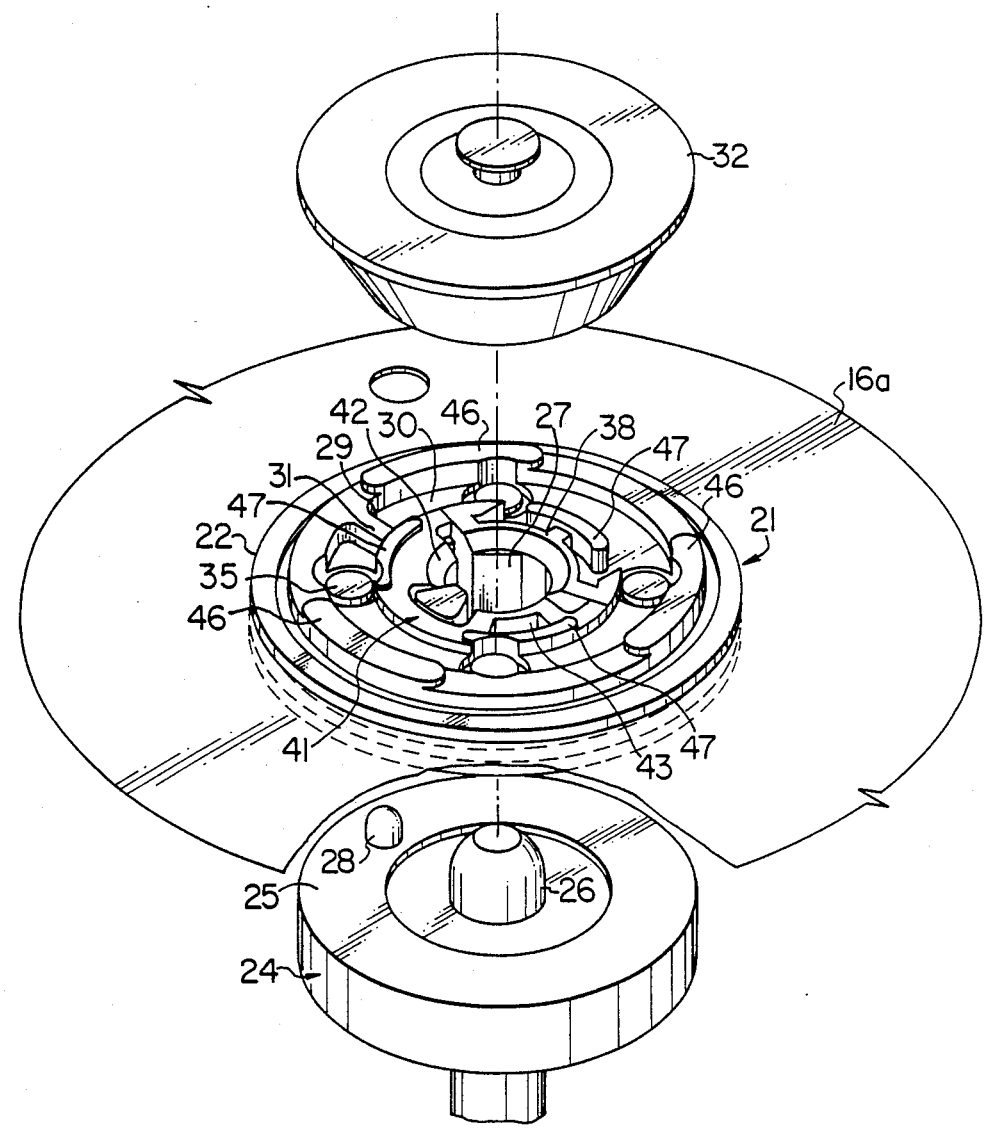
FIG. 12 is an exploded perspective view of the relationships of the rotary disk and the disk driving means, showing their relation.

As shown in FIGS. 10–12, the disk driving means 24 comprises the turntable 25 and a collet 32 facing the turntable 25. The turntable 25 has the main spindle 26 extending from the center of the top surface of the turntable 25, and the drive shaft 28 located outwardly of the main spindle 26 on the top surface of the turntable 25.

If the case 17, with the rotary disk 16, is set on the disk driving means 24, the top and the bottom surfaces of the hub 21 are held between the turntable 25 and the collet 32 at the center aperture 18 of the case 17 and the main spindle 26 is received in the center opening 27 while the drive shaft 28 enters the guide groove 30. Thereafter, rotation of the turntable 25 brings the drive shaft 26 into engagement with the receiving surface 29.

Referring to FIGS. 10 and 11, the upper structural member 22 and the lower structural member 23 of the hub 21 are formed on surfaces thereof which face each other in positions biased toward outer peripheries, with sheet holding annular surfaces 33, 34 projecting from the respective surfaces and located concentrically with the center opening 27 of the hub 21.

Figure 13:
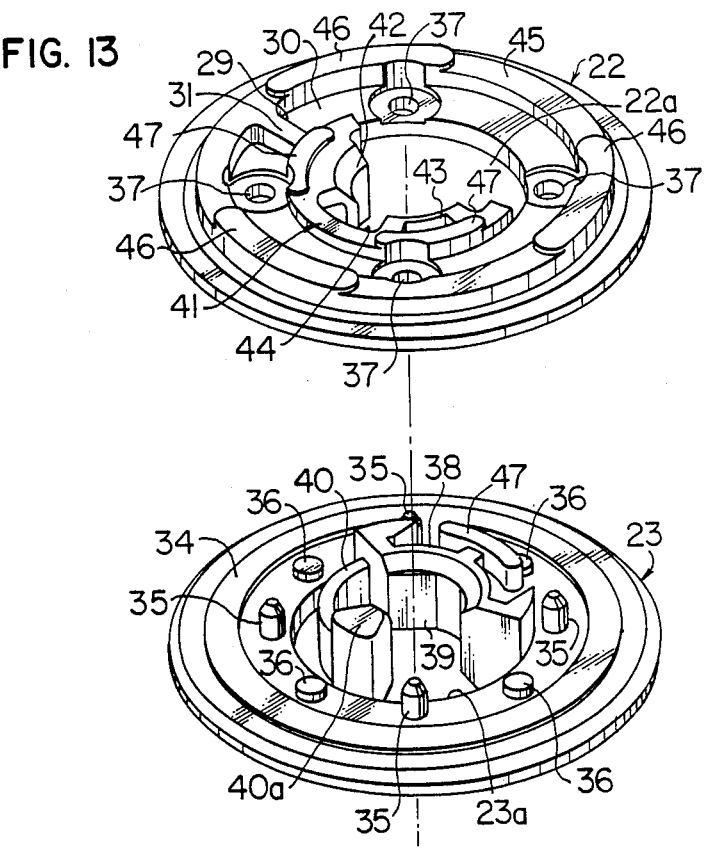
FIG. 13 is an exploded perspective view of the hub shown in FIG. 7.
Figure 14:
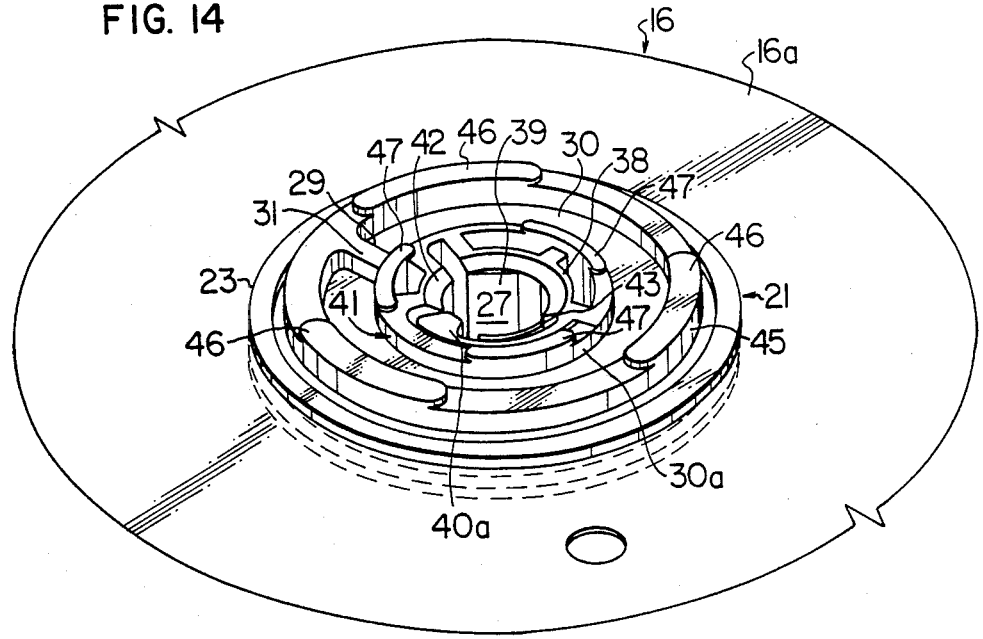
FIG. 14 is a perspective view, as seen from below, of the rotary disk shown in FIG. 12.
Figure 15:
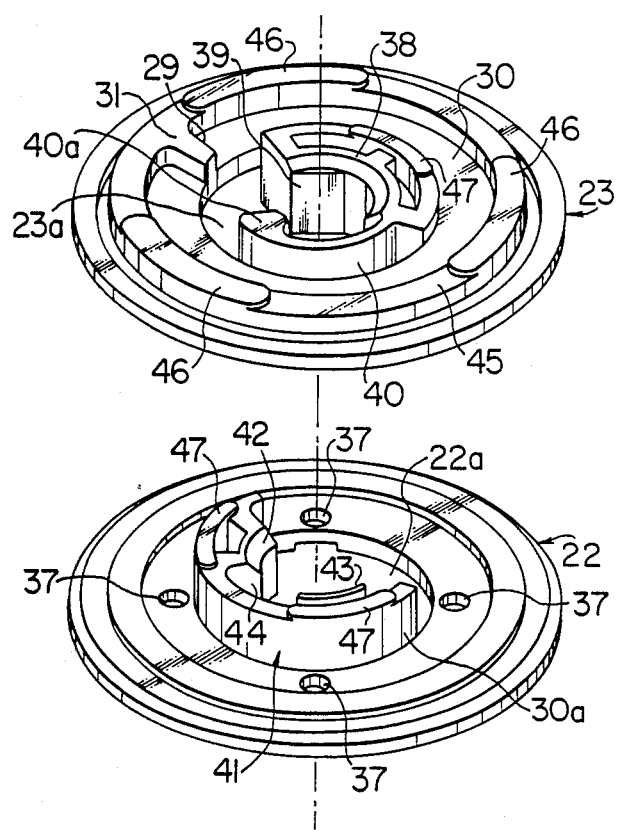
FIG. 15 is an exploded perspective view, as seen from below, of the hub shown in FIG. 13.

Referring to FIG. 13, four welding pins 35 of a greater height and four sheet positioning pins 36 of a smaller height are alternately arranged on the top surface of the lower structural member 23 of the hub 21 in positions located inwardly of the sheet holding surface 34 toward the center opening 27. The upper structural member 22 of the hub 21 is formed with apertures 37 for receiving the welding pins 35 therein.

In assembling the sheet 16a with the hub 21, the sheet 16a is placed on the top surface of the lower structural member 23 of the hub 21 and the peripheral edge of the circular opening 16b of the sheet 16a is brought into contact with the positioning pins 36, to thereby obtain positioning of the sheet 16a with respect to the hub 21. Then, the upper structural member 22 of the hub 21 is placed on the sheet 16a to insert the welding pins 35 of the lower structural member 23 of the hub 21 into the apertures 37 formed in the upper structural member 22 thereof. Thereafter, upper ends of the welding pins 35, projecting upwardly from the apertures 37 into the guide groove 30 of the upper structural member 22, are melted by ultrasonic waves to weld the upper and lower structural members 22, 23 into a unitary structure to provide the hub 21 assembled with the sheet 16a. In this condition, the peripheral edge portion of the circular opening 16b of the sheet 16a is held only between the sheet holding surfaces 33 and 34, to secure the sheet 16a to the hub 21. A gap g (FIGS. 10 and 11) is defined between the upper and the lower structural members 22 and 23 of the hub 21 in portions thereof located toward the outer peripheries from the sheet holding surfaces 33 and 34.

Formed in a central portion of the lower structural member 23 is a relief hole 23a (see FIG. 13) for defining the center opening of the hub 21 having a projecting wall portion 38 in the relief hole 23. The projecting wall portion 38 is formed on its inner surface with two planar surfaces 39 and 39a forming an included angle of about 90° which are to be in point contact with the main spindle 26 at two points P1 and P2 (FIG. 9) and symmetrical with respect to the line of radius extending through the center of the hub 21.

Projecting from the projecting wall portion 38 is a cantilever-type arcuate resilient member 40 having a center of curvature at the center of the hub 21. The resilient member 40 is formed at its free end with a head 40a which, located in face-to-face relation to the two planar surfaces 39 and 39a, is in point contact with an outer periphery of the main spindle 26 at a point P3, to thereby lightly press the main spindle 26 against the two planar surfaces 39 and 39a.

As shown in FIG. 13, the upper structural member 22 is formed with a relief hole 22a for receiving the projecting wall portion 38 of the lower structural member 23, and a segmental boss 41 adapted to be received in the relief hole 23a of the lower structural member 23. The segmental boss 41 includes an inner wall surface 30a (FIG. 9) constituting an inner wall of the guide groove 30 on the bottom surface of the hub 21, two projecting walls 42 and 43 defining a part of the center opening 27 and extending from the inner wall surface 30a toward the center of the hub 21, and a recess 44 defined between the two projecting walls 42 and 43 and extending vertically.

When the upper and the lower structural members 22, 23 are engaged together into a unitary structure, the resilient member 40 has an intermediate arm inserted from below into a recess 42a (FIG. 11) formed at the projecting wall 42 and a head 40a inserted in the recess 44. The head 40a has an inner end surface which is nearer to the center of the center opening 27 than the inner end surfaces of the two projecting walls 42 and 43. An annular projection 45 defining a radially outer surface of the guide groove 30 on either surface of the hub 21 is formed with three outer reference surfaces 46 for the turntable 25. The projecting wall portion 38 and the segmental boss 41, defining an inner wall of the guide groove 30, are formed with a plurality of inner reference surfaces 47 for the collet 32. The inner reference surfaces 47 are smaller in height than the outer reference surfaces 46.

In the construction shown in FIGS. 7–15, when the main spindle 26 of the turntable 25 is inserted in the center opening 27 of the hub 21, the two planar surfaces 39, 39a is pressed by the resilient member 40 against the main spindle 26, so that the center of rotation of the rotary disk 16 is automatically brought into alignment with the center of rotation of the main spindle 26. If the turntable 25 is rotated at this time, the drive shaft 28 of the turntable 25 is pressed against the receiving surface 29 of the hub 21 to strongly press the planar surfaces 39 and 39a against the main spindle 26. Thus, even if a strong shock is applied to the rotary disk 16 and the disk driving means 24, the center of rotation of the main spindle 26 and the center of rotation of the rotary disk 16 are not displaced from each other.

When the rotary disk 16 is set on the turntable 25, and, while the rotary disk 16 is rotating, pressing forces are applied to the hub 21 by the resilient member 40 and the drive shaft 28 and no pressing forces are exerted on the sheet 16a. This allows the thickness of the sheet 16a to be reduced without the risk of damage of the sheet.

The force with which the two planar surfaces 39, 39a are pressed against the main spindle 26 is obtained from the pressing forces applied by the drive shaft 28 and the resilient member 40. Because of this, the pressing force applied by the resilient member 40 may be such that, when the rotary disk 16 is set on the turntable 25, the planar surfaces 39, 39a of the hub 21, are in light contact with the main spindle 26.

In the construction shown in FIGS. 7-15, the lower structural member 23 of the hub 21 is formed integrally with the resilient member 40, so that this construction has improved productivity as compared with the construction shown in FIGS. 1-6 in which a plate spring is used as a resilient member.

From the foregoing description, it will be appreciated that, in the present invention, the risk that the magnetic sheet might be damaged if its thickness is small can be eliminated. The rotary disk according to the invention is simple in construction and allows alignment of the center of rotation of the rotary disk with the center of rotation of the turntable to be automatically obtained when the former is set on the latter.

What is claimed is:

1. A rotary disk comprising:
a recording and reproducing sheet; and
a hub formed of hard material secured to a central portion of said sheet, said hub comprising:
a center opening formed in the hub and having an area large enough to loosely receive a main spindle of a turntable of a disk driving means therein;
two generally planar surfaces arranged in an intersecting relationship to each other and formed on an inner peripheral wall of said center opening in said hub; and
a resilient member located in a position facing said two planar surfaces for pressing said main spindle against said two planar surfaces;
wherein said hub further comprises at least one receiving surface formed therein so as to extend transverse to a direction of movement of thereof upon rotation of said rotary disk in a direction of rotation for receiving a driving force applied thereto upon rotation thereof in said rotation direction, said receiving surface having a positional and directional relationship with respect to said two planar surfaces such that said two planar surfaces of said hub are pressed against said main spindle by said driving force applied from said drive shaft to said receiving surface of said hub in said direction of movement during said rotation of said drive shaft.

2. A rotary disk as claimed in claim 1, wherein said receiving surfaces are formed on respective top and bottom surfaces of said hub.

3. A rotary disk as claimed in claim 1, wherein said hub further comprises an upper structural member formed with a boss, and a lower structural member formed with a hole adapted to fit said boss of said lower structural member.

4. A rotary disk as claimed in claim 1, wherein said resilient member comprises a plate spring.

5. A rotary disk as claimed in claim 1, wherein said resilient member is formed integrally with said projecting wall portion of said center opening.

6. A rotary disk as claimed in claim 1, wherein said driving force applied from said drive shaft to said receiving surface of said hub is substantially parallel with a force exerted by said resilient member to press said two planar surfaces of said hub relative to said main spindle.

7. A rotary disk as claimed in claim 1, wherein a force, exerted by said resilient member to press said two planar surfaces of said hub relative to said main spindle lies along a virtual plane dividing an angle included by said two planar surfaces into two halves, said virtual plane passing through a line at which said two planar surfaces or extension thereof intersect with each other.

8. A rotary disk as claimed in claim 1, wherein said two planar surfaces form an included angle set at a range between 60 and 120 degrees.

9. A rotary disk as claimed in claim 8, wherein said included angle is substantially 90 degrees.

* * * * *